Patented Oct. 17, 1922.

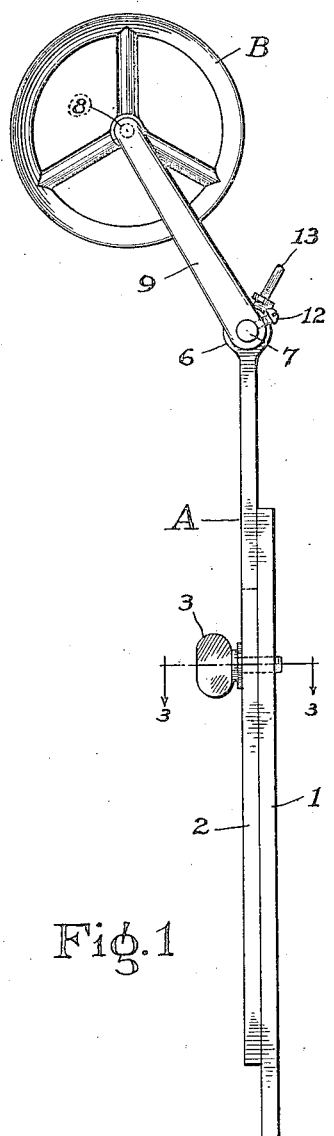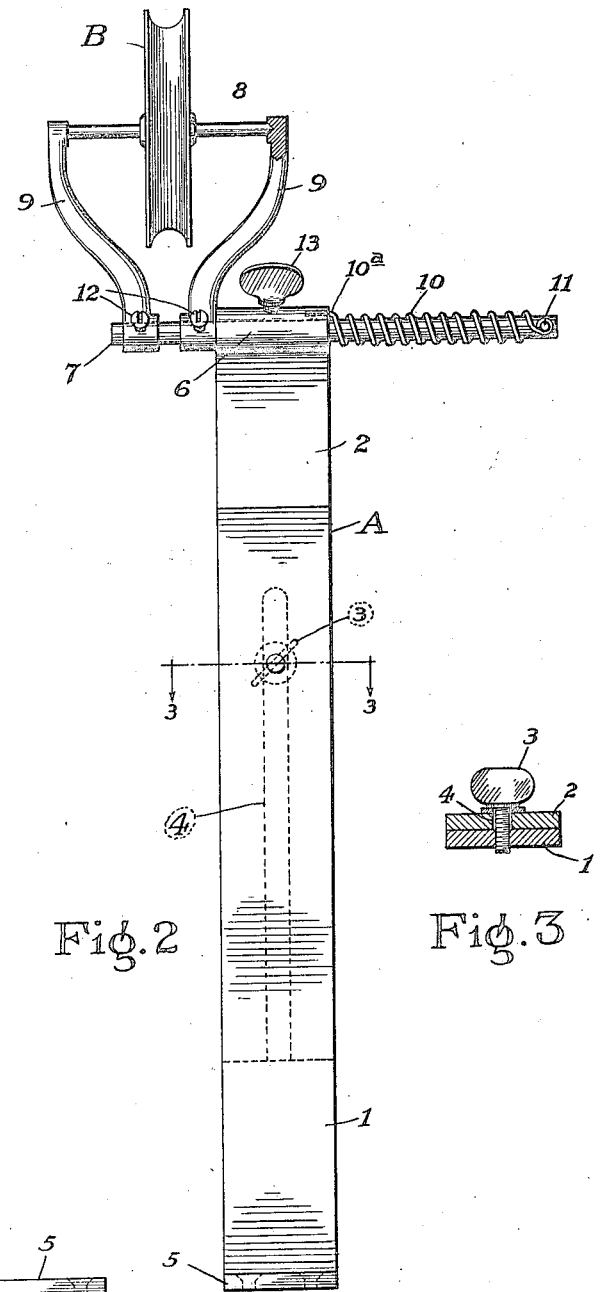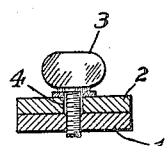

1,432,129

UNITED STATES PATENT OFFICE.

ALLEN CLARK STRINGER, OF ST LOUIS, MISSOURI.

AUTOMATIC BELT TIGHTENER.

Application filed September 24, 1921. Serial No. 502,843.

*To all whom it may concern:*

Be it known that I, ALLEN CLARK STRINGER, a citizen of the United States, residing at St. Louis, Missouri, have invented a certain new and useful Improvement in Automatic Belt Tighteners, of which the following is a full, clear, and exact description, such as will enable others skilled in the art to which it appertains to make and use the same.

This invention relates to belt tighteners of the kind that automatically take up the slack in a driving belt.

One object of my invention is to provide an automatic belt tightening device of simple design and construction in which the belt engaging member is normally held in contact with the belt by means of a spring, thereby causing the slack in the belt to be taken up instantly when the machine driven by the belt is put in operation.

Another object is to provide an inexpensive belt tightening device that can be installed easily on various kinds of machines equipped with a driving belt operated from a pulley on a line shaft and which is so constructed that it can be easily adjusted to compensate for wear or to vary the position of the belt engaging element of same, thereby enabling the device to be used with various kinds or types of machines. Other objects and desirable features of my invention will be hereinafter pointed out.

I have herein illustrated my invention embodied in a belt tightening device that is intended to be used for automatically taking up the slack in a round driving belt that is used for driving a machine from a line shaft, such, for example, as a factory sewing machine, but I wish it to be understood that the device is capable of use with various kinds of machines or belts.

Figure 1 of the drawings is a side elevational view of my improved belt tightening device.

Figure 2 is a front elevational view of said device; and

Figure 3 is a horizontal sectional view, taken on the line 3—3 of Figures 1 and 2.

Referring to the drawings which illustrate the preferred form of my invention, A designates a vertically-adjustable supporting element composed preferably of two flat bars 1 and 2 arranged in overlapped relation and adjustably connected together by a set screw or other similar device 3 threaded into the bar 1 and projecting through a vertically-disposed slot 4 in the bar 2. The bar 1 is provided at its lower end with a flange or laterally bent portion 5 through which screws or other suitable fastening devices can be inserted so as to connect the support A to a floor or other supporting structure and the bar 2 is provided at its upper end with a bearing 6 in which a horizontally-disposed shaft 7 is arranged. The belt engaging element of the device preferably consists of a grooved wheel B rigidly connected to a horizontally-disposed shaft 8 that fits in bearings in the upper ends of a pair of arms 9 connected to the shaft 7. Said belt engaging element B is normally held in contact with the belt (not shown) with which the device co-operates by means of a torsion spring 10 mounted on a portion of the shaft 7 that projects laterally from the support A and having one of its ends connected to said shaft, as, for example, by means of a pin 11, and its opposite end connected to the bearing 6 in which the shaft turns, as, for example, by means of an extension $10^a$ on said spring that projects into a hole in one end of the bearing 6. The spring 10 exerts pressure on the shaft 7 in such a direction that the wheel B carried by the arms 9 on said shaft will be normally held in yielding engagement with the driving belt, said spring being of such tension that the wheel B holds the belt tight and automatically takes up the slack in same without, however, imposing a load on the driving belt. In the form of my invention herein illustrated the shaft 8 which carries the wheel B is provided with pointed or cone-shaped ends, as shown in Figure 2, that project into correspondingly shaped recesses or bearings in the upper ends of the arms 9, and said arms are adjustably connected to the shaft 7 by set screws or other suitable devices 12 so as to enable said arms to be brought closer together to take up the wear on the ends of the shaft 8 or shift the wheel B sidewise. I also prefer to provide the bearing 6 at the upper end of the support A with a set screw or other suitable device 13 that is adapted to be moved into engagement with the shaft 7 when it is desired to lock said shaft in such a position as to hold the belt engaging element B out of contact with the belt, as, for example, when the machine with which the device is used is not in service, thereby permitting the driving belt to run free.

The main advantage of a belt tightening device of the construction above described is that it is sensitive enough to instantly take up the slack in a driving belt of the kind that is used for connecting up a line shaft with a machine equipped with a clutch that is used for starting and stopping the machine at intervals. For example, in a factory sewing machine it is the universal custom to equip the machine with a clutch having a continuously operating member that is driven by a belt which passes over a pulley on a line shaft. In the sewing operation the operator in charge of the machine has to start and stop the machine numerous times in sewing a garment. Accordingly, it is essential that the belt tightening device that is used on such a machine be constructed in such a way that it will instantly take up the slack in the belt when the clutch is thrown in so as to connect up the machine with the driving belt. My improved belt tightening device has this desirable characteristic because the belt engaging element B of same is normally held in yielding engagement with the driving belt by means of the torsion spring 10. Moreover, such a device can be installed and quickly adjusted to a particular machine, owing to the fact that the support A of same can be lengthened or shortened to change the height of the belt engaging element B, and the arms 9 that carry said belt engaging element can be adjusted longitudinally of the shaft 7 so as to adjust the belt engaging element B laterally or to compensate for wear on the shaft 8 to which said belt engaging element is connected.

Still another desirable feature of such a belt tightening device is that the belt engaging element B can be held out of contact with the belt by rocking the arms 9 in a direction to disengage said element from the belt and then manipulating the set screw 13 so as to lock the shaft 7 and prevent it from moving under the influence of the spring 10. A belt tightening device of the construction above described can be used either with a straight belt or with a crossed belt, and when it is used with a crossed belt, it prevents the belt from becoming worn at the point where the belt crosses by rubbing of the belt connecting device that joins the ends of the belt together, owing to the fact that the grooved wheel B of the device causes the belt to travel in such a path that the two portions of the belt do not rub against each other at the point where they cross.

Having thus described my invention, what I claim as new and desire to secure by Letters Patent is:

1. A belt tightening device, comprising a support adapted to be arranged in proximity to the driving belt of a machine, a rockable means on said support provided with a grooved belt engaging element, a spring that normally exerts pressure on said rockable means in such a way that the belt engaging element is held in contact with the belt with which it co-operates, means for enabling said belt engaging element to be adjusted vertically and laterally so as to line it up with the driving belt of the machine, and means for enabling said element to be retained in an inoperative position.

2. A belt tightening device, comprising a support, a rock shaft on said support, a belt engaging element carried by said rock shaft, means for enabling said element to be adjusted laterally with relation to the belt with which it co-operates, a torsion spring that normally exerts pressure on said rock shaft in a direction tending to hold said belt engaging element in contact with the belt with which it co-operates, and means for enabling the height or elevation of said rock shaft to be changed.

3. A belt tightening device, comprising a support, a rock shaft journaled in a bearing in said support and projecting laterally in opposite directions therefrom, a pair of arms on said shaft arranged at one side of said support, a rotatable belt engaging wheel carried by said arms, and a torsion spring surrounding said shaft at the other side of said support for exerting pressure on said rock shaft in a direction to hold said wheel in engagement with the belt with which the device is used.

4. A belt tightening device, comprising a support that is adapted to be connected to a floor, a rockable belt engaging element carried by said support, a spring that normally holds said element in engagement with the belt with which it cooperates, means for enabling said belt engaging element to be adjusted vertically and also laterally with relation to the belt, and means for holding said element in an inoperative position.

5. A belt tightening device, comprising a support adapted to be mounted on a floor and constructed in such a manner that it can be raised and lowered, a rockable shaft carried by said support, a rotatable belt engaging wheel provided with a shaft equipped with pointed ends, adjustable arms on said rockable shaft that bear against the ends of said wheel shaft, and a torsion spring that exerts pressure on said rockable shaft in such a manner that said wheel is normally held in engagement with the belt with which the device is used.

6. A belt tightening device, comprising a support, a rock shaft carried by said support, a pair of spaced arms adjustably connected to said rock shaft in such a manner that they can be adjusted longitudinally of said shaft so as to vary the distance between said arms, a grooved belt engaging wheel provided with a shaft that is arranged between said arms and supported by same, and a torsion spring combined with said support and rock shaft for exerting pressure on said rock shaft in such a direction that said wheel will be held in yielding engagement with the belt with which the device is used.

7. A belt tightening device, comprising a vertically-disposed support adapted to be connected to a floor and composed of two bars arranged in overlapped relation, means for adjustably connecting said bars together so as to enable the height of the support to be changed, a bearing at the upper end of one of said bars, a horizontally-disposed rock shaft journaled in said bearing and projecting laterally in opposite directions from said bearing, a pair of arms adjustably connected to said shaft at one side of said bearing, a grooved belt engaging wheel secured to a horizontally-disposed shaft having tapered ends that project into recesses in said arms, a torsion spring surrounding said rock shaft at the opposite side of said bearing and connected to said shaft and bearing in such a manner that it normally holds the belt engaging wheel in contact with the belt with which the device co-operates, and means on said shaft bearing for locking said rock shaft so as to hold said wheel out of engagement with the belt.

A. CLARK STRINGER.